Figure 1:
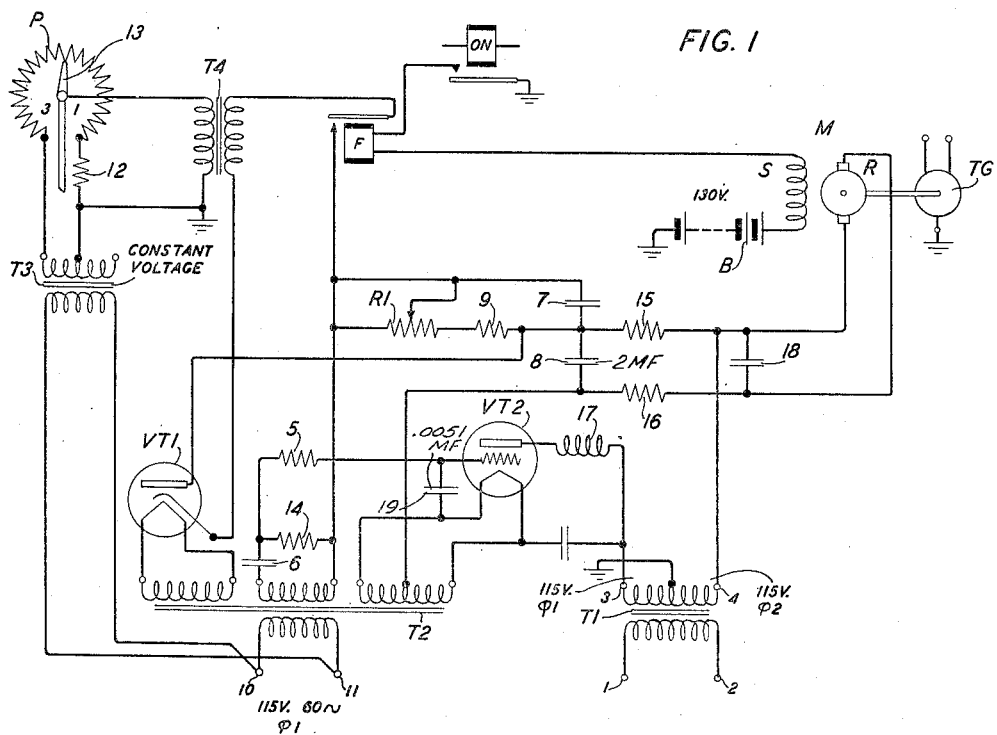

Jan. 3, 1950  C. E. GERMANTON  2,493,064
MOTOR-CONTROL CIRCUIT
Filed June 30, 1944

INVENTOR
C. E. GERMANTON
BY
P. C. Smith
ATTORNEY

Patented Jan. 3, 1950

2,493,064

UNITED STATES PATENT OFFICE 2,493,064

MOTOR-CONTROL CIRCUIT

Charles E. Germanton, Summit, N. J., assignor to Bell Telephone Laboratories, Incorporated, New York, N. Y., a corporation of New York Application June 30, 1944, Serial No. 542,983

7 Claims. (Cl. 318—345)

This invention relates to motor-control systems and more particularly to a motor-generator circuit for generating power to drive the tachometers of an aircraft trainer whereby such tachometers may be operated to simulate the operation of the tachometers of an actual aircraft in response to the control of the engine by the flight engineer of such aircraft.

It is the object of the present invention to provide a control circuit for a motor which drives a tachometer generator whereby such generator may be driven at a speed which at any instant is commensurate with a simulated speed in revolutions per minute.

It is a further object of the invention to provide an electronic control for a direct current motor whereby the electronic device may be biased by an alternating current potential so that the firing point of the device is advanced smoothly across the entire 180-degree range.

The foregoing objects and others pertinent thereto are accomplished by providing an electronic device responsive to an input potential, the anode of which device is supplied with anode potential from one phase of a source of alternating current and the cathode of which is connected through the rotor circuit of a motor to the opposite phase of the source of alternating current, whereby each time the electronic device becomes conducting in response to a half wave of the input control potential, an impulse of unidirectional current is transmitted through the rotor circuit of the motor. With its stator winding energized from a direct current source, the motor is thereby caused to operate. The control grid of the electronic device is normally biased from an alternating current source to a potential so that the device conducts only at the end of the positive half cycle of the anode potential and the average current may or may not be enough to barely turn over the motor and the firing point is advanced by superimposing a positive direct current component of the biasing potential which is modified by the incoming control signal by virtue of the fact that the intersection of the critical and resultant grid voltage is advanced. The alternating current biasing potential is caused to lead and to be opposite in phase to the anode potential whereby when the direct current potential is superposed on it, a smooth advance of the firing point across the entire 180-degree range is attained.

Figure 2:
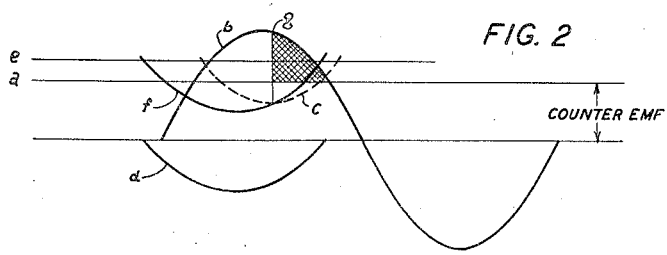

The novel features of the invention are set forth in the appended claims and the invention as to its organization and its mode of operation will be best understood from the following detailed description when read in connection with the drawing in which:

Fig. 1 is a circuit diagram illustrating the motor-control circuit of the present invention; and Fig. 2 shows curves illustrating the relationship of the potentials applied to the cathode, grid and anode elements of the electronic-control device of the circuit of Fig. 1.

The motor M is of the direct current type and has its stator winding S energizable in series with the winding of relay F in response to the operation of relay ON. The rotor R of the motor is energized by 230-volt 60-cycle current supplied from the secondary winding of power transformer T1, the primary winding of which transformer is connected to the terminals 1 and 2 of a source of alternating current. This current is rectified by the gas-filled tube VT2 so that in response to each firing of the tube, a unidirectional impulse of current is transmitted through the rotor winding of the motor. Terminals 3 and 4 of the secondary winding of transformer T1 are so connected to the anode of tube VT2 and to the lower brush of the motor M, that the motor will run in such a direction as to cause the tachometers driven by the tachometer generator TG coupled to the rotor shaft of the motor M, to give positive indications.

For controlling the motor M, a gas-filled tube VT2 is provided, the filament of which is heated by alternating current supplied from the right secondary winding of the power transformer T2 and the anode of which is supplied with anode potential from the secondary winding of transformer T1 as previously described. Alternating current biasing potential is applied between the grid and cathode of the tube VT2 over a circuit which extends from the grid through resistance 5, through resistance 14 which has an alternating current potential with a leading phase angle imposed upon it by the condenser 6 through the middle secondary winding of the transformer T2, through the condensers 7 and 8 to the mid-point of the right secondary winding of transformer T2 and thence to the filament of tube VT2 which serves as a cathode. A condenser 19 having a capacitance of approximately .0051 microfarad is connected directly between the grid and cathode of tube VT2 for the purpose of absorbing electrostatic and high frequency disturbances.

For producing the direct current potential which is superimposed on the alternating biasing potential of tube VT2, the rectifier tube VT1 is provided having its filament heated by alternating current supplied from the left secondary winding of transformer T2. The primary winding of transformer T2 is connected to terminals 10 and 11 which are connected to a source of 60-cycle alternating current. The terminals 10 and 11 are also connected to the primary winding of a constant voltage transformer T3, the secondary winding of which is bridged across the winding of a control potentiometer P in series with a resistance 12. One terminal of the potentiometer and the brush 13 thereof are connected to the terminals of the primary winding of transformer T4. Thus the movement of the brush 13 over the winding of the potentiometer is instrumental in deriving a potential from the potential impressed upon its winding from the transformer T3 and impressing such derived potential upon the primary winding of transformer T4.

The secondary winding of transformer T4 is connected over a circuit extending from the cathode of rectifier tube VT1, through such secondary winding, over the contacts of relay F, through the right portion of the winding of rheostat R1 and resistance 9 in series, bridged by condenser 7, to the anode of tube VT1. Tube VT1 thus rectifies the input control potential and this rectified potential is regulated by the adjustment of the slider of rheostat R1. A potential derived from this potential is super-imposed upon the alternating current grid biasing potential and applied between the cathode and grid of tube VT2 over a path which may be traced from the grid of the tube VT2, through resistances 5 and 14, through the right portion of the winding of rheostat R1, resistances 9 and 15, through the rotor circuit of motor M, through resistance 16 to the mid-point of the right winding of transformer T2 and to the filament or cathode of tube VT2.

It will now be assumed that the brush 13 of potentiometer P is set in any desired manner, as by a motor of an aircraft trainer which responds to controls operated by a flight engineer in simulation of the control of an engine of an aircraft to vary the revolutions per minute of such engine, such controls being, for example, of the character disclosed in the application of J. J. Lukacs et al. Serial No. 542,846, filed concurrently herewith. In accordance with the setting of the brush 13 of potentiometer P, a potential is impressed upon the secondary winding of transformer T4 and, with relays ON and F operated, the potential impressed upon the secondary winding of transformer T4 is rectified by tube VT1 and impressed as a grid-control potential between the grid and cathode of tube VT2, superimposed upon the alternating current biasing potential impressed between the grid and cathode of such tube. At the same time an alternating current potential is applied as an anode potential upon the anode of tube VT2 from the secondary winding of transformer T1 as previously described.

These potentials are graphically illustrated in Fig. 2. The base line $a$ represents the cathode potential, the curve $b$ represents the anode potential, the curve $d$ represents the alternating current biasing potential, the line $e$ represents the difference between the impressed direct current component and the counter-electromotive force of the motor as determined by the setting of the brush of potentiometer P, the curve $f$ represents the resultant grid potential and the dotted curve $c$ represents the critical grid potential required to fire the tube VT2. It is to be noted that the alternating current grid potential represented by the curve $d$ and the resultant alternating current grid potential represented by the curve $f$, are opposite and leading in phase with respect to the anode potential represented by the curve $b$. Thus during each positive half cycle of the anode potential $b$, the tube VT2 will fire at the point $g$ when the resultant biasing potential rises to an amount where it equals or slightly exceeds the critical grid potential $c$.

Each time that the tube VT2 fires, an impulse of current flows through the rotor circuit R of the motor M over a path which may be traced from the lower brush of the motor, through the secondary winding of transformer T1, through the choke coil 17, across the anode-cathode path through the tube to the mid-point of the right secondary winding of transformer T2, thence through resistance 16 to the other brush of the motor. With its stator winding S energized from the direct current source B, the motor in response to the impulses of current transmitted through its rotor winding by the repeated firing of tube VT2, rotates at an accelerating speed. During each interval that the tube VT2 is non-conductive, motor M is operating at a substantially uniform speed by reason of the discharge of condenser 18 through its rotor winding and is thereby producing a counter-electromotive force which is proportional to the speed of the motor.

This counter-electromotive force is applied between the grid and cathode of tube VT2 in opposition to the control potential produced in response to the incoming control potential as modified by the potentiometer P, over a path which extends from the lower brush of motor M, through resistance 15, resistance 9, rheostat R1, resistances 14 and 5 to the grid of tube VT2 and from the filament of tube VT2 to the mid-point of the right secondary winding of transformer T2, thence through resistance 16 to the upper brush of motor M. The effect of this counter-electromotive force is to tend to neutralize the impressed direct current grid component when the motor M attains a speed commensurate with the setting of the brush of potentiometer P. When this occurs, firing of the tube VT2 is retarded to a point where the average current is just strong enough to keep the motor M going at the speed corresponding to the input potential.

When the tube VT2 ceases firing either momentarily or when direct current biasing potential becomes reduced to a zero value through the counterbalancing effects of the counter-electromotive force, the motor M coasts and an inductive surge potential is generated in the motor opposite in polarity to the impulses which have been driving the motor, which surge potential becomes applied to the cathode of the tube VT2 whereby such tube might falsely transmit another false driving impulse through the rotor circuit of the motor. When this impulse ceases through the extinguishment of the tube another inductive surge potential applied from the motor may again fire the tube although no direct current bias is applied or is entirely balanced by the counter-electromotive force of the motor.

The false firing of the tube by such inductive surges from the motor is prevented by the condenser 8 of large capacitance in the order of 2 microfarads. When the motor is being driven by impulses transmitted through its rotor circuit through the tube VT2, the counter-electromotive force generated by the motor is applied across the terminals of condenser 8 through resistances 15 and 16 whereby such condenser becomes charged. Whenever the motor ceases to receive driving impulses and starts to coast the charge on condenser 8 becomes applied as a positive potential to the cathode of tube VT2 in opposition to the negative potential applied thereto by the inductive surge from the motor and therefore the cathode of the tube cannot become sufficiently negative with respect to the grid to cause the tube to fire falsely.

If in simulation of the operation of an aircraft engine, the brush 13 is moved toward the left terminal of its winding, indicative of an increase in speed of the engine, the potential applied to the control grid of the tube VT2 is increased. Since a higher speed requires a higher average current and produces a higher counter-electromotive force, the potential of the grid relative to the cathode must be increased to advance the point of firing and hence the difference between the direct current component as determined by the potentiometer and the counter-electromotive force must also increase. As before described, the motor will now maintain an increased constant speed as determined by the new setting of the potentiometer. Similarly, if the brush 13 is moved toward the right terminal of the potentiometer winding in simulation of a reduction in speed of the engine, the speed of motor M becomes reduced.

As previously stated, the motor M may be employed to drive the generator TG which in turn generates current to drive the tachometers on the instrument panels of the trainer.

While the control circuit of the invention has been described as particularly applicable for driving the tachometers of an aircraft trainer in response to the simulated control of an engine, it is to be understood that it is of general utility and may be employed where it is required that the speed of a motor shall be varied at a linear rate with respect to a control potential.

What is claimed is:

1. A motor-control circuit comprising a motor having a rotor circuit and a stator circuit, a first source of alternating current, an electronic device having its anode potential supplied from said source in series with said rotor circuit, a second source of alternating current, means for applying potential from said second source to the grid of said device leading and opposite in phase with respect to said anode potential for biasing said grid, means for rectifying potential from said second source and superimposing it upon said alternating current biasing potential, means for modifying the direct current component of said biasing potential in accordance with a signal condition, a first condenser of small capacitance connected between the cathode and the grid of said electronic device for absorbing high frequency interference, a second condenser of large capacitance connected across the rotor circuit of said motor whereby when said motor is being impulse driven by said electronic device said latter condenser is maintained charged and means for applying the charge potential on said latter condenser to said electronic device in opposition to potential surges from said motor following the cessation of the transmission of driving impulses through the rotor circuit thereof.

2. A motor-control circuit comprising a direct current motor having a rotor circuit and a stator circuit, a source of direct current for energizing said stator circuit, a first source of alternating current, an electronic device having its anode potential supplied from said alternating current source in series with said rotor circuit, a second source of alternating current, means for applying potential from said latter source to the grid of said device leading and opposite in phase with respect to said anode potential for biasing said grid, means for rectifying potential from said latter source and superimposing it upon said alternating current biasing potential, means for modifying the direct current component of said biasing potential in accordance with a signal condition, a first condenser of small capacitance connected between the cathode and the grid of said electronic device for absorbing high frequency interference, a second condenser of large capacitance connected across the rotor circuit of said motor whereby when said motor is being impulse driven by said electronic device said latter condenser is maintained charged and means for applying the charge potential on said latter condenser to said electronic device in opposition to potential surges from said motor following the cessation of the transmission of driving impulses through the rotor circuit thereof.

3. A motor-control circuit comprising a motor having a rotor circuit and a stator circuit, a first source of alternating current, an electronic device having its anode potential supplied from said source in series with said rotor circuit, a second source of alternating current, means for applying potential from said second source to the grid of said device leading and opposite in phase with respect to said anode potential for biasing said grid, a rectifier for rectifying potential from said second source, means for superimposing said rectified potential as a positive bias upon said alternating current biasing potential, means for modifying said rectified potential in accordance with a signal condition, a first condenser of small capacitance connected between the cathode and the grid of said electronic device for absorbing high frequency interference, a second condenser of large capacitance connected across the rotor circuit of said motor whereby when said motor is being impulse driven by said electronic device said latter condenser is maintianed charged and means for applying the charge potential on said latter condenser to said electronic device in opposition to potential surges from said motor following the cessation of the transmission of driving impulses through the rotor circuit thereof.

4. A motor-control circuit comprising a motor having a rotor circuit and a stator circuit, a first source of alternating current, an electronic device having its anode potential supplied from said source in series with said rotor circuit, a second source of alternating current, means for applying potential from said second source to the grid of said device leading and opposite in phase with respect to said anode potential for biasing said grid, a rectifier tube, a biasing circuit for said electronic device extending through said tube, means for impressing current from said second source upon said biasing circuit whereby said potential is rectified by said tube and superimposed as a positive direct current component of said alternating current biasing potential upon the grid of said device, a potentiometer associated with said latter means for varying the value of said direct current component to control the firing of said device, a first condenser of small capacitance connected between the cathode and the grid of said electronic device for absorbing high frequency interference, a second condenser of large capacitance connected across the rotor circuit of said motor whereby when said motor is being impulse driven by said electronic device said latter condenser is maintained charged and means for applying the charge potential on said latter condenser to said electronic device in opposition to potential surges from said motor following the cessation of the transmission of driving impulses through the rotor circuit thereof.

5. A motor-control circuit comprising a motor having a rotor circuit and a stator circuit, a source of direct current for energizing said stator circuit, a first source of alternating current, an electronic device having its anode potential supplied from said alternating current source in series with said rotor circuit, said motor being operative in response to driving impulses transmitted through its rotor circuit upon the firing of said device on successive positive half cycles of said anode potential, a second source of alternating current, means for applying potential from said second source to the grid of said device leading and opposite in phase with respect to said anode potential for biasing said grid, a rectifier tube, a biasing circuit for said electronic device extending through said tube, means for impressing current from said second source upon said biasing circuit whereby said potential is rectified by said tube and superimposed as a positive direct current component of said alternating current biasing potential upon the grid of said device, a potentiometer associated with said latter means for varying the value of said direct current component to control the firing of said device, means for impressing the counter-electromotive force of said motor upon the grid of said device in opposition to the biasing potential whereby said motor is controlled to maintain a speed commensurate with the value of direct current biasing potential as determined by the setting of said potentiometer, a first condenser of small capacitance connected between the cathode and the grid of said electronic device for absorbing high frequency interference, a second condenser of large capacitance connected across the rotor circuit of said motor whereby when said motor is being impulse driven by said electronic device said latter condenser is maintained charged and means for applying the charge potential on said latter condenser to said electronic device in opposition to potential surges from said motor following the cessation of the transmission of driving impulses through the rotor circuit thereof.

6. A motor-control circuit comprising a motor having a rotor circuit and a stator circuit, a source of alternating current, an electronic device having its anode potential supplied from said source in series with said rotor circuit, said motor being operative in response to driving impulses transmitted through its rotor circuit upon the firing of said device, means for applying biasing potential to the grid of said device, means for modifying said biasing potential in accordance with a signal condition, a condenser of small capacitance connected between the cathode and grid of said electronic device for absorbing high frequency interference, a second condenser of high capacitance, means for applying the counter-electromotive force of said motor across said latter condenser whereby when said motor is being impulse driven by said device said latter condenser is maintained charged and means for applying the charge potential on said latter condenser to the input circuit of said device in opposition to potential surges from said motor to prevent the false operation of said device due to the inductive surges from said motor following the cessation of the transmission of driving impulses through the rotor circuit thereof.

7. A motor-control circuit comprising a motor having a rotor circuit and a stator circuit, a source of alternating current, an electronic device having its anode potential supplied from said source in series with said rotor circuit, said motor being operative in response to driving impulses transmitted through its rotor circuit upon the firing of said device, means for applying biasing potential to the grid of said device, means for modifying said biasing potential in accordance with a signal condition, means for impressing the counter-electromotive force of said motor upon the grid of said device in opposition to the biasing potential, whereby said motor is controlled to maintain a speed commensurate with the value of the signal controlled modification of said biasing potential, a condenser of small capacitance connected between the cathode and grid of said electronic device for absorbing high frequency interference, a second condenser of high capacitance bridged across said motor and charged by said counter-electromotive force when said motor is being impulse driven and means for applying the charge potential on said latter condenser to the cathode grid circuit of said device in opposition to potential surges from said motor applied to said cathode grid circuit from said motor to prevent the false operation of said device due to the inductive surges from said motor following the cessation of the transmission of driving impulses through the rotor circuit thereof.

CHARLES E. GERMANTON.

REFERENCES CITED

The following references are of record in the file of this patent:

UNITED STATES PATENTS

| Number | Name | Date |
|---|---|---|
| 1,985,003 | Von Engel et al. | Dec. 18, 1934 |
| 2,175,009 | Anderson | Oct. 3, 1939 |
| 2,264,333 | Satterlee | Dec. 2, 1941 |

FOREIGN PATENTS

| Number | Country | Date |
|---|---|---|
| 413,741 | Great Britain | June 17, 1934 |
| 446,848 | Great Britain | May 7, 1936 |